Aug. 16, 1932.  A. A. NICHOLS ET AL  1,872,041
GRINDING MACHINE
Filed Sept. 11, 1929   6 Sheets-Sheet 1
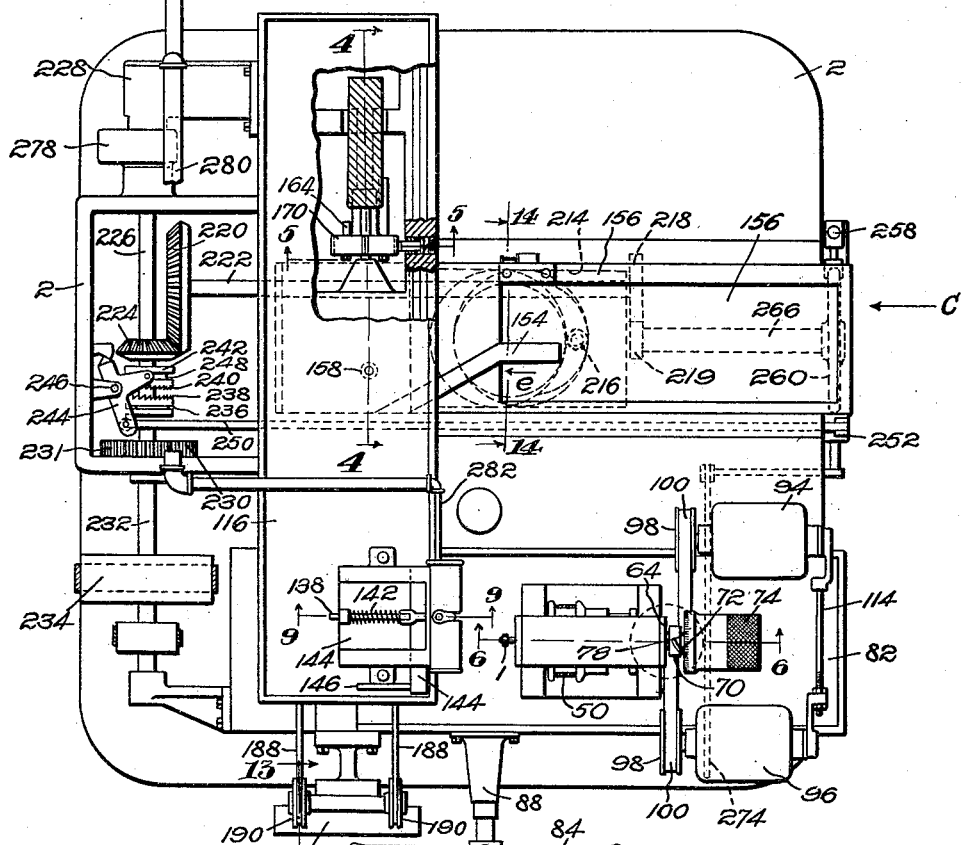
Fig. 1.
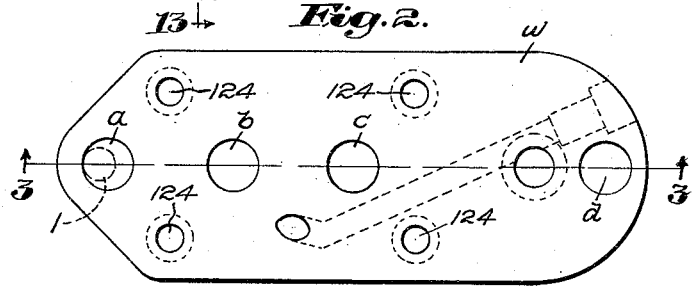
Fig. 2.
Fig. 3.
Inventors:
Arthur A. Nichols,
William H. Nichols.
by Emery, Booth, Varney & Townsend
Attys.

Aug. 16, 1932. A. A. NICHOLS ET AL 1,872,041
GRINDING MACHINE
Filed Sept. 11, 1929 6 Sheets-Sheet 3

Inventors:
Arthur A. Nichols.
William H. Nichols,
by Emery, Booth, Varney & Townsend
Attys.

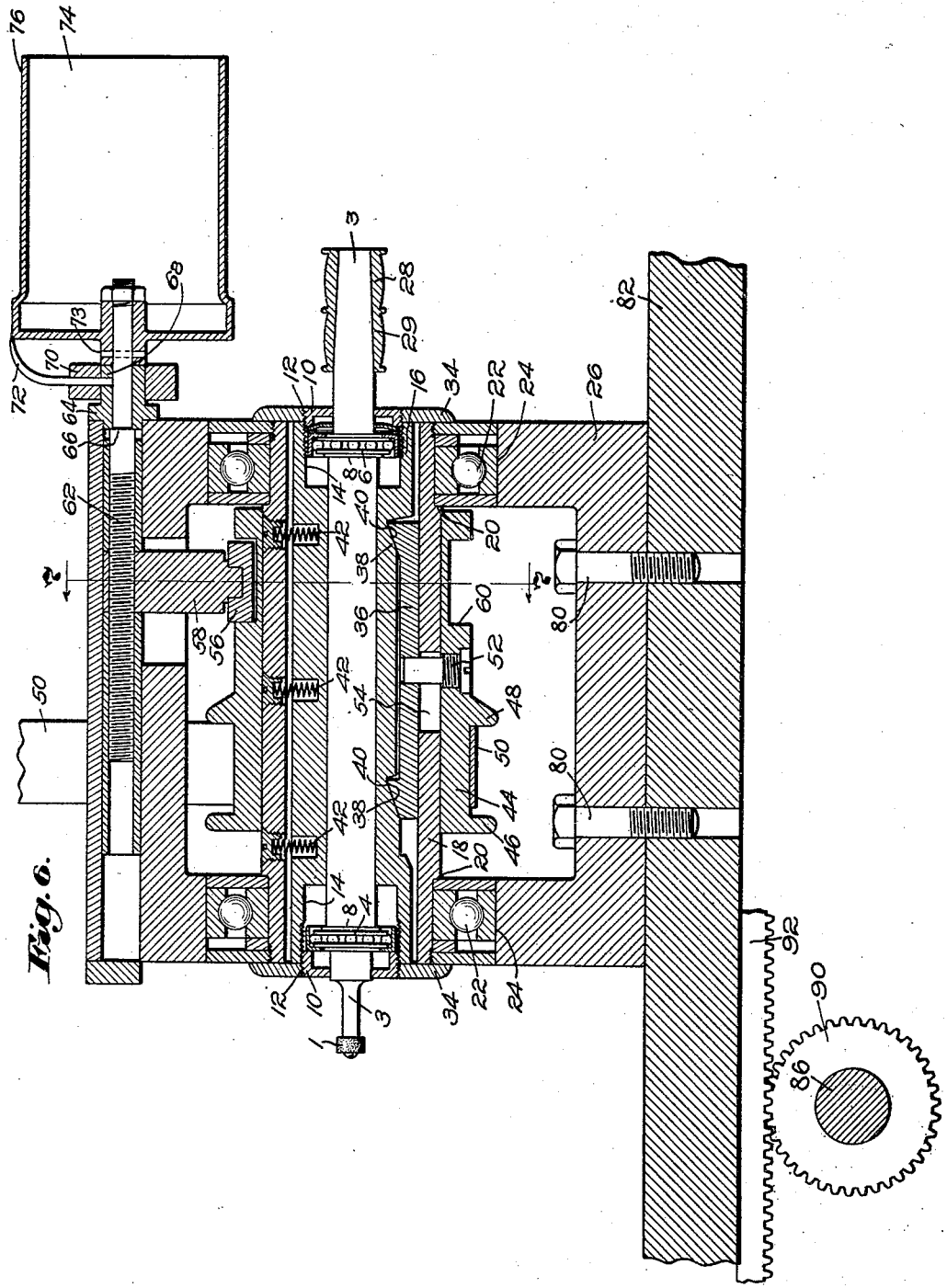

Aug. 16, 1932.   A. A. NICHOLS ET AL   1,872,041
GRINDING MACHINE
Filed Sept. 11, 1929   6 Sheets-Sheet 5
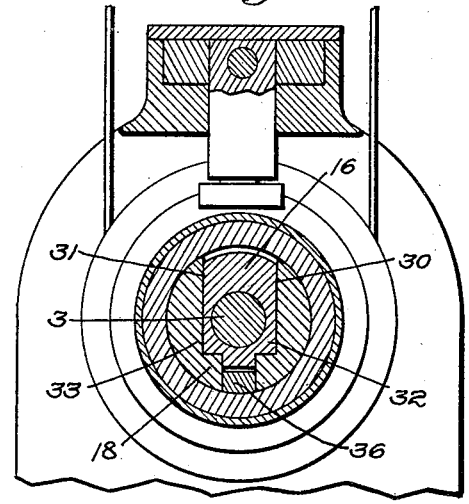
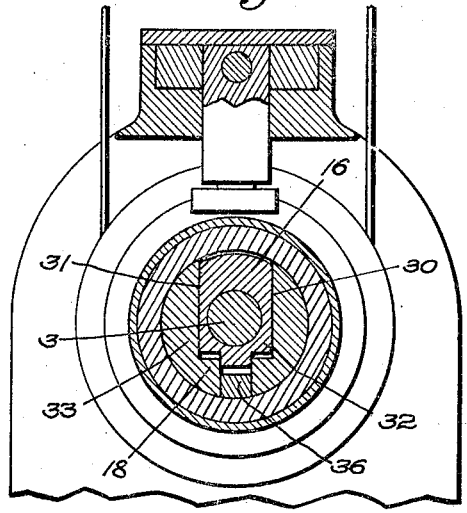
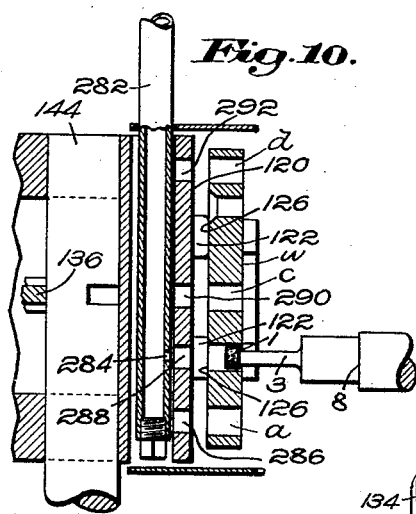
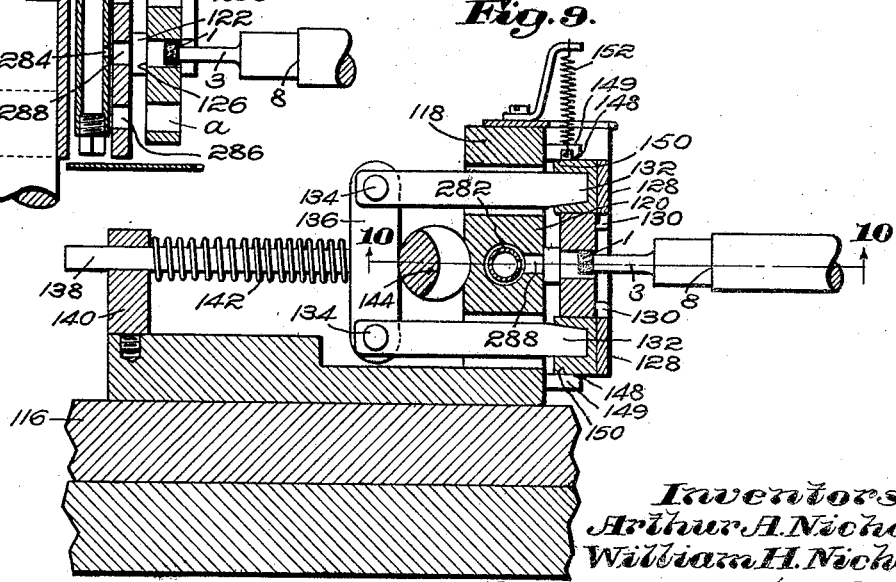
Inventors:
Arthur A. Nichols,
William H. Nichols,
by Emery, Booth, Varney & Townsend
Attys

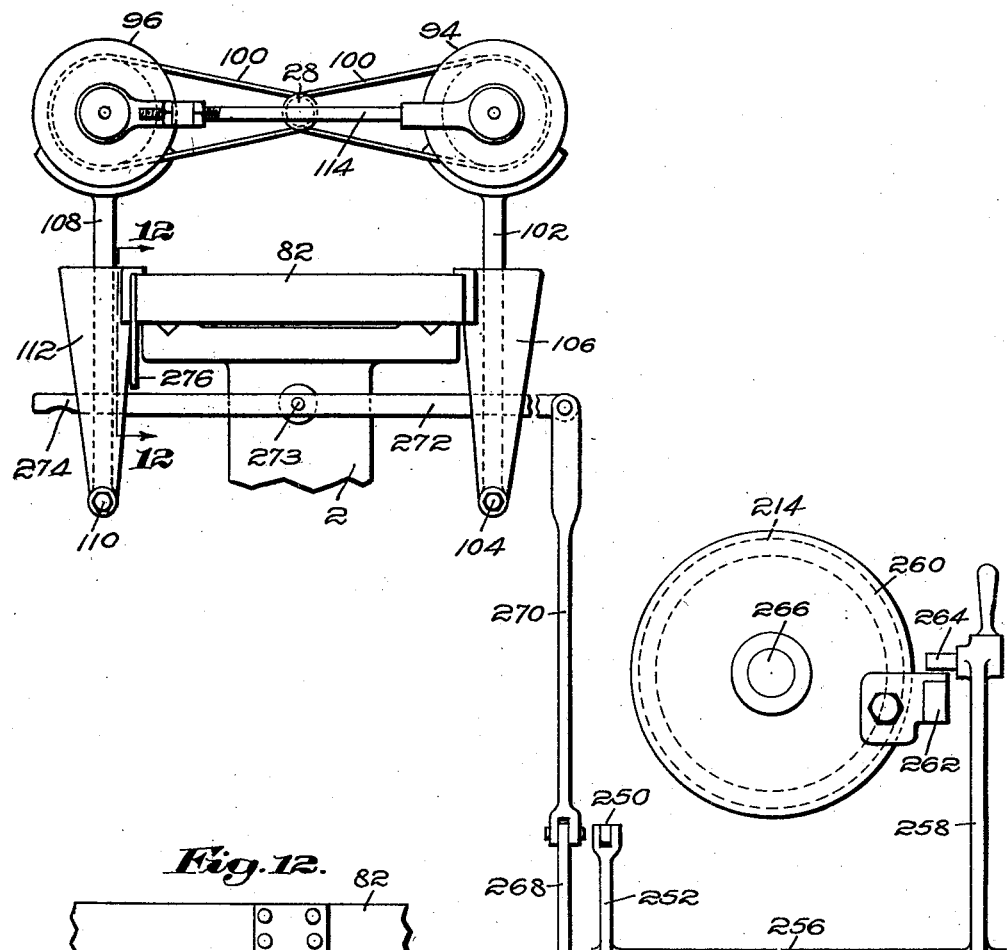
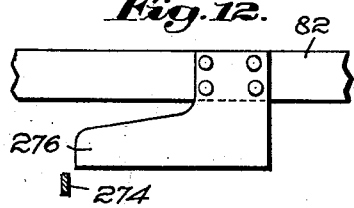

Patented Aug. 16, 1932

1,872,041

UNITED STATES PATENT OFFICE

ARTHUR ANGUS NICHOLS AND WILLIAM HART NICHOLS, OF WALTHAM, MASSACHUSETTS

GRINDING MACHINE

Application filed September 11, 1929. Serial No. 391,858.

This invention aims to provide an improved grinder for rapidly and accurately grinding a series of holes in the work.

In the accompanying drawings is shown, merely for illustrative purposes, a grinder capable of practicing this invention, wherein Fig. 1 is a plan view of the machine;

Fig. 2 is a front elevation of one form of work adapted to be performed upon the present embodiment of the invention;

Fig. 3 is a longitudinal section of the work taken on line 3—3 of Fig. 2;

Fig. 6 is a longitudinal section along the axis of the grinder mandrel on the line 6—6 of Fig. 1;

Fig. 7 is a section taken transversely of the grinder mandrel on the line 7—7 showing the axis of the grinder mandrel concentric with the axis about which said mandrel is revolved;

Fig. 8 is a section similar to Fig. 7 showing the axis of the grinder mandrel eccentric with respect to the axis about which said grinder is revolved;

Fig. 9 is a detail section on line 9—9 of Fig. 1;

Fig. 10 is a horizontal section on line 10—10 of Fig. 9;

Fig. 11 is a diagrammatic side elevation of the machine viewed in the direction of the arrow C;

Fig. 12 is a detail section on line 12—12 of Fig. 11;

Figure 4:
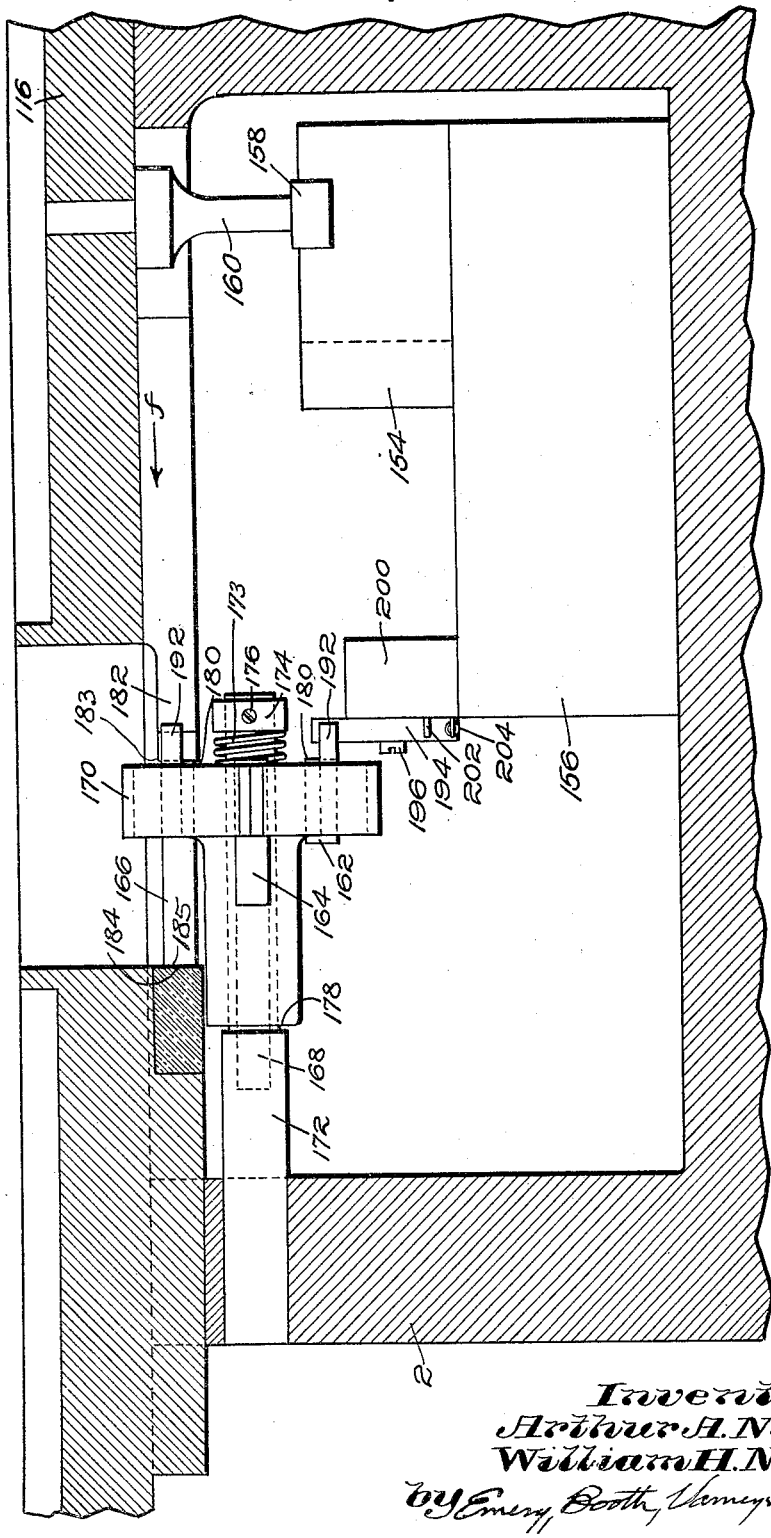
Fig. 4 is a detail vertical section taken longitudinally of the work carrying table on line 4—4 of Fig. 1.

The particular embodiment of this invention selected for purposes of illustration, and shown in the drawings, comprises a machine of the type known as a planetary grinder, in which the grinder member 1 rotates about its own axis and revolves about an axis eccentric to its own axis on a gradually increasing radius and the work is presented to and automatically spaced with respect to the grinder member so that the grinding of a series of holes may be successfully accomplished quickly and with great accuracy. It is however to be understood that the invention is not limited to this type of grinder.

The present machine comprises a frame 2 upon which are mounted the various devices and mechanisms composing the machine. These consist preferably of a cylindrical grinder 1 secured to one end of a mandrel 3 journaled to rotate in suitable bearings 4 and 6 (see Fig. 6). The mandrel 3 is shouldered at opposite ends as at 8 and against these shoulders the ball bearing units are seated, while against the opposite faces of said ball bearing units an adjustable ring 10 is provided for the purpose of centrally locating the mandrel 3 within its mountings and preventing endwise motion of said mandrel. The rings 10 are screw-threaded at 12 to engage corresponding threads formed within recesses 14 at opposite ends of a core member 16. The core member 16 in turn is arranged within a hollow sleeve 18 shouldered at opposite ends at 20 to seat suitable bearing units 22, the latter being secured in recesses 24 in a head 26. The mandrel 3 is provided at its end opposite to the end carrying the grinder member 1 with twin pulleys 28 and 29 which are secured to said mandrel and through which rotary motion is imparted to said mandrel in the manner hereinafter more fully set forth.

By means of the pulleys 28 and 29 the grinder member 1 may be rotated about its own axis at a very high rate of speed to cause said grinder member to grind the surface of the work.

In addition to the rotating movement imparted to said grinder by the pulleys 28 and 29, said grinder is arranged to revolve about an axis eccentric to the axis of said mandrel and grinder, and desirably the degree of eccentricity is variable whereby the circular path described by the axis of said grinder may be increased or diminished according to the size of the hole desired in the work. To the above ends portions of the core 16 are preferably flattened on opposite sides 30 and 31 (see Figs. 7 and 8), and these flattened portions are arranged respectively to fit corresponding surfaces 32 and 33 in the hollow sleeve, permitting limited radial sliding movement of the core member 16 within said sleeve. Movement of the core member 16 longitudinally of the hollow sleeve 18 is prevented by collars 34 secured to opposite ends of said core member in screw-threaded engagement with the rings 10 and in sliding engagement with the ends of said hollow sleeve.

Desirably the means employed herein for varying the eccentricity of the mandrel 3 relatively to the hollow sleeve 18 consists of a longitudinal slidable member 36 having inclined wedging surfaces 38 near its opposite ends for engaging correspondingly inclined wedging surfaces 40 formed on the core member 16, and interposed between the sides of said core member opposite said wedges and the adjacent portions of said hollow sleeve are springs 42 which constantly maintain the wedge surfaces 40 and 38 in contact. Upon movement of the slidable member 36 longitudinally relatively to the core member 16, said core member together with the mandrel and its grinder member will be moved transversely of the axis of said hollow sleeve, positively in one direction and yieldingly in the other direction.

It will be apparent from the foregoing construction that the radial or transverse movements of said mandrel with respect to said hollow sleeve may be accomplished even during the rotation of said sleeve as well as of said mandrel.

Slidably mounted upon the hollow sleeve member 18 is a pulley 44 provided with flanges 46 and 48 between which a belt 50 is arranged to run and from which said pulley 44 receives its rotary motion. The pulley 44 is secured to rotate with the sleeve 18 by reason of a stud 52 extending from said pulley, to which it is secured in any appropriate manner, through an elongated slot 54 formed in said sleeve 18 and of a width proximating the diameter of said stud so that any rotary movement of the pulley 50 will be transmitted to said sleeve. The inner end of the stud 52 extends beyond the elongated slot 54 into engagement with the wedge or sliding member 36 causing said sliding member to rotate with said pulley 44 and to move axially therewith.

To effect longitudinal movement of the sliding wedge member 36 the pulley 44 is moved axially by a roller 56 secured to rotate upon the end of the sliding block 58, within an annular groove 60 formed in the hub or exterior face of said pulley 44. The sliding block 58 is arranged to slide in a portion of the head 26, movement being imparted thereto by a screw 62 secured against endwise movement in said head 26 by a collar 64 engaging a shoulder 66 near the end of said screw. The collar 64 is secured to said head 26 and has a hub 68 constituting a bearing for said screw and supporting a collar 70 through which an index member 72 is inserted. To the outer end of the screw 62 a drum 74 is attached by a pin 73, said drum being of relatively large diameter and provided with a knurled surface 76 permitting the same to be readily turned by the operator of the machine. Graduations 78 are also formed at the opposite end of said drum 74 for cooperating with the index finger 72 to assist the operator in adjusting said pulley 44 and wedge member longitudinally of the sleeve, said graduations representing the degree of eccentricity of said grinder member relatively to the axis of said hollow sleeve 18.

The head 26 is secured herein by screws 80 to a slide 82 slidably mounted on the frame 2 in any appropriate manner to move in a direction parallel with the axis of said grinder member, movement being imparted to said slide 82, herein by means of a hand wheel 84 (see Figs. 1 and 6) secured to a shaft 86 journaled in a bearing 88 in the frame 2. A pinion 90 is secured to said shaft 86 and meshes with a rack 92 carried by said slide 82, thus by rotating the hand wheel 84, the slide 82 together with the grinder member carried thereby may be moved axially of said grinder member into and out of engagement with the work hereinafter described.

Rotary motion is imparted to the mandrel 3 of the grinder member 1 through the pulleys 28 and 29 desirably from electric motors 94 and 96 (see Figs. 1 and 11) arranged on opposite sides of the mandrel 3 and each provided with a driving pulley 98 from which power is transmitted by belts 100 to the pulleys 28 and 29. By arranging the motors 94 and 96 upon opposite sides of the mandrel uniform tension may be applied to the mandrel to prevent unequal wear upon the bearings within which said mandrel rotates. To maintain the belts 100 tight regardless of the eccentricity of said grinder member relatively to the hollow sleeve the motors 94 and 96 are pivotally supported to swing with the pulleys 28 and 29 during planetary movements of said grinder. For example, the motor 94 is secured to the upper end of a swinging arm 102 pivoted at 104 to a bracket 106 suspended from the slide 82. The motor 96 is likewise supported upon the upper end of the swinging arm 108 pivoted at 110 to a bracket 112 secured to the opposite side of said slide 82 from the bracket 106. An adjustable connecting rod 114 extends from the arbor of the motor 94 to the arbor of the motor 96 so as constantly to maintain the proper tension upon the belts 100 regardless of the positions of said motors relatively to the slide 82.

The belt 50 which operates the pulley 44 for revolving the grinder member may receive its power from any appropriate source, for example from an elongated pulley arranged above the machine but not shown in the drawings. By elongating said pulley the belt 50 may be shifted thereon during the feeding or retracting movements of the grinder member relatively to the work, which movements are accomplished as hereinbefore stated by the turning of the hand wheel 84.

The type of work to which the present machine is particularly adapted is shown in Figs. 2 and 3 and has a series of holes, for example four holes $a$, $b$, $c$ and $d$, arranged herein in a row across a plate $w$, although it is to be understood that the invention is not limited to the grinding of work of the specific character shown, the reason for showing this type of work being merely to more clearly illustrate the speed and accuracy made possible by the present invention over former methods and machines.

Within the hole $a$ the grinder 1 is shown dotted so as to illustrate the size thereof relative to the diameter of said hole.

In the present exemplification of the invention the work is supported upon a carrier which is movable transversely of the axis of the grinder in a succession of steps to align the holes to be ground with the axis about which the grinder revolves, herein the axis of the hollow sleeve 18, and the eccentricity of the grinder following the alignment of one of the holes with its axis is varied, after the grinder has been moved to operative relation with the work, until the correct diameter has been reached following which the work grinder may be withdrawn and the work advanced to bring a second hole into working alignment, and so on until all of the holes in the work, namely the holes $a$, $b$, $c$ and $d$, have been ground to size.

To facilitate the foregoing operations the work $w$ is placed within a suitable work holder upon a work carrier 116 slidably mounted upon the frame 2 to move in a direction approximately at right angles to the axis of the grinder member 1. The work holder comprises an upright bracket 118 having a work face 120 arranged herein at right angles to the axis of the wheel mandrel 3 (see particularly Figs. 1, 9 and 10). Secured to the face 120 are positioning pins 122 having reduced ends for entering holes 124 in the work $w$, said pins being shouldered at 126 to maintain the work parallel with the face 120 and for positioning the centers of the holes $a$, $b$, $c$ and $d$ in proper relation to the axis of the grinder member 1.

Means are provided for clamping the work upon said pins against said shoulders 126, said means desirably consisting of clamps 128 one above and the other below the work with lips 130 for extending over the front edges of said work. The clamping pieces 128 are each secured to the end of a pivoted arm 132, which arms are pivoted at 134 to opposite ends of a cross head 136 secured to the forward end of a rod 138 slidably mounted in the bearing 140 carried by the slide 116. A spring 142 encircles said rod 138 between the bearing 140 and said cross head 136 and tends normally to keep the clamps 128 open. Rotatably mounted at the rear of the member 118 and in front of the cross head 136 is a cam 144 arranged to be rotated by hand lever 146 to retract the cross head 136 and cause the lips 130 of the clamping members to engage and force the work back against the shoulders of said positioning pins. Movement of said cam in the opposite direction allows the spring 142 to move said clamps away from and free the work. During the clamping movement of said clamps under the action of the cam 144 the members 128 are guided to their clamping positions by beveled surfaces 148, formed upon guide pins 149, engaging the rear corners 150 of the members 128, thus moving said clamping members toward each other into engagement with the edges of the work $w$. When released by the rotation of the cam 144 the members 128 move toward the right (Fig. 9) until said inclined or beveled faces 148 are reached, whereupon the lower member 128 drops by gravity and the upper member is raised by a spring 152, thus opening the jaws to permit the removal or insertion of the work.

Figures 13, 14:
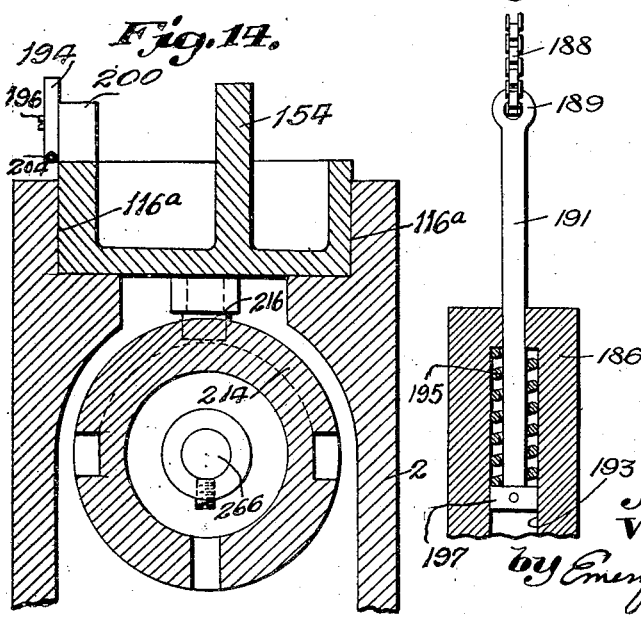
Fig. 13 is a detail section on line 13—13 of Fig. 1.
Fig. 14 is a detail section on line 14—14 of Fig. 1.

The work carrier slide 116 may be reciprocated by any appropriate means, for example by means of a cam 154 carried by a slide 156 (Figs. 1, 4 and 5) movable substantially at right angles to the carrier slide 116 in suitable guides 116a (Fig. 14). The cam 154 is arranged to engage a cam roller 158 on the under side of the work carrier slide 116 as shown most clearly in Figs. 1 and 4, said roller being supported upon a stud 160 depending from said slide 116.

An important feature of this invention consists in automatic means for quickly and accurately positioning the roughed-out holes in the work with selected positions of the axis about which the grinder member revolves, so that in case said roughed-out holes are inaccurately spaced, such inaccuracies will be automatically corrected. In the form of work shown in Figs. 2 and 3 there are four holes, as hereinbefore stated, namely $a$, $b$, $c$ and $d$, and these holes are not regularly spaced; therefore means are provided for moving and automatically stopping said work so that first the hole $a$ will be properly positioned with respect to the axis about which the grinder member revolves, herein the axis of the hollow sleeve 18, and after this hole has been ground to size the work is moved the desired distance to a second hole, herein the hole $b$, and stopped, and so on from $b$ to $c$ and from $c$ to $d$, although the invention is not limited to the particular order shown. Accordingly there is herein provided a series of positioning devices in the form of stop or gauge pins which are adapted to be interposed successively one by one between the carrier slide and a fixed abutment on the machine frame, and power driven means are additionally provided which, when started into operation, complete a cycle of movement effecting first the retraction of the carrier slide from the then effective stop pin, followed by the automatic readjustment of the positioning devices to present a stop pin of different length, and finally a movement of the carrier slide to its new position of alignment as determined by the newly presented stop pin, after which the operation of such power driven positioning mechanism is automatically stopped. To this end there is provided a series of gauges 162, 164, 166 and 168 which are in the nature of interchangeable pins varying in length in accordance with the spacing between and the arrangement of the several holes $a$, $b$, $c$ and $d$. These pins in the present example are detachably mounted in a rotary carrier 170 supported centrally on a fixed shaft 172 mounted in the frame 2 of the machine. A collar 174 is secured by a screw 176 to said shaft 172 in front of said rotary carrier and maintains the same in place on said shaft. The several pins 162, 164, 166 and 168 project through the carrier 170 a slight distance as shown at 180, and these projecting ends at times contact with a fixed abutment 182 carried by the frame 2, the opposite ends of the pins which project at different distances from the carrier functioning to engage an abutment 184 on the slide 116 and bring the latter to rest at a definitely gauged position. The projecting ends of the pins 162, 164, 166 and 168 are desirably prevented from engaging the abutment 182 during the rotation of said carrier 170 in order to avoid unnecessary wear upon said pins and the cooperating abutments 184 and 182, both of which have hardened faces 185 and 183 respectively. To this end a limited movement of the carrier 170 is effected upon the stud 172 by a spring 173 interposed between the collar 174 and the adjacent face of said carrier 170, said spring acting to move said carrier and pins slightly to the left in Fig. 4 when pressure from the abtument 184 is removed.

The final movement of the abutment 184 just prior to the engagement of the right hand end of the pin 166 with the abutment 182 effects the compression of said spring 173.

As motion is imparted to the slide 156 in the direction of the arrow $C$ on Fig. 1 and toward the observer in Fig. 4, the cam 154 engages the roller 158 and causes the work carrier slide 116 to move rearwardly in the direction of the arrow $f$ (see Fig. 4) and to a position that will place the abutment 184 beyond the rear end of the longest pin, herein the pin 168 which herein will position the work to grind the hole $a$. Upon movement of the cam 154 in the opposite direction to that indicated by the arrow $C$, the roller 158 will follow along and constantly engage the face of the cam 154, until one of the stop pins is engaged, by reason of pressure brought to bear upon said work carrier slide 116 by a weight 186 suspended by chains 188 extending from the forward end of said slide over pulleys 190 and downwardly to said weight 186, thus permitting a follow up movement of the slide 116 in a forward direction that will always be at a uniform speed regardless of the distance said slide has to travel, and a positive movement thereof in the opposite direction, that is in the direction of the arrow $f$. The purpose of the aforementioned operation of said slide is to enable said slide to vary its forward movements in accordance with the variations in length of the stop pins 162, 164, 166 and 168, said slide being stopped by the abutment 184 engaging whichever of said series of pins happens to be in a position to engage said abutment 184 and the abutment 182.

The chains 188 are desirably yieldingly attached to the weight 186 so as to reduce the strain upon the connecting parts when the slide 116 strikes the abutments, and stops. To this end each chain 188 is attached to an eye 189 formed upon a rod 191, which latter extends into a recess 193 formed in the weight 186. A spring 195 encircles said rod within said recess, seating at one end against the end of said recess and at the other end against a collar 197 secured to said rod.

Figure 5:
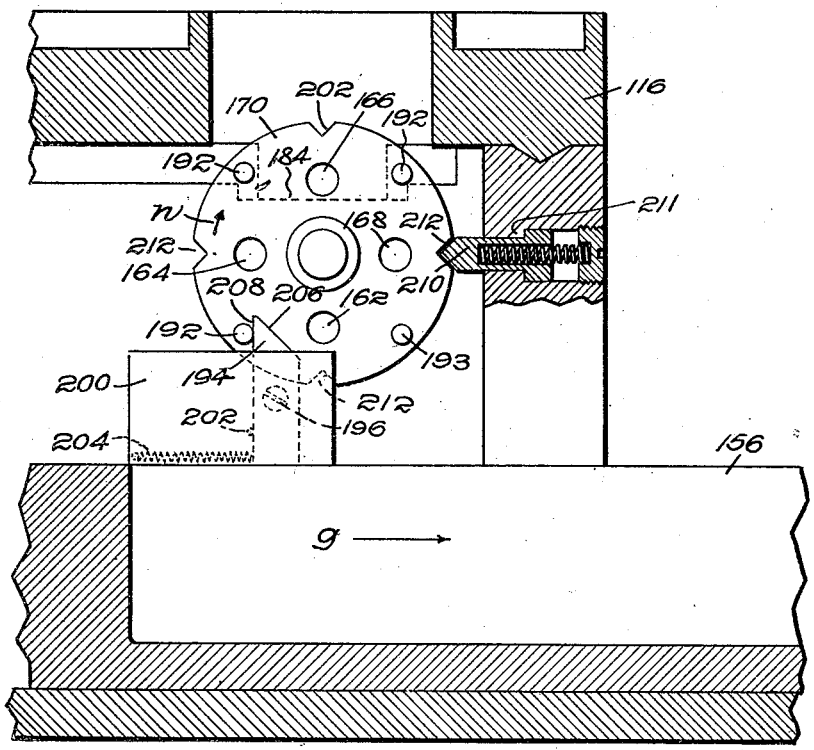
Fig. 5 is a detail section on line 5—5 of Fig. 1 taken transversely of the work carrying table.

The gauge pins 162, 164, 166 and 168 are advanced at the proper times in the operation of the machine by means including a series of pins 192, in the present example, there are four of these pins secured to the forward face of the carrier 170, there being one pin for each of said gauge pins. Cooperating with said pins 192 is a pawl 194 pivoted upon a screw 196 carried by an upstanding lug 200 on the slide 156 (see Figs. 4 and 5). A stop pin 202 maintains said pawl normally in vertical position to strike the pin 192, it being yieldingly held in said position by a spring 204. The right hand side of said pawl as viewed in Fig. 5 is beveled at 206, which beveled surface is engaged by one of the pins, herein the pin 193 at the right thereof in Fig. 5, when said slide 156 moves in the direction of the arrow $g$, thereupon causing said pawl to be tilted so that it will pass under and escape said pin 193. Upon the return of the slide 156 in the opposite direction the perpendicular face 208 of said pawl will engage said pin 193, and cause the carrier 170 to be rotated an amount sufficient to advance the gauge pins 162, 164, 166 and 168 forward one step in the direction of the arrow *n* (see Fig. 5), thus bringing the next gauge in the series in position to be engaged by the abutments 184 and 182. A spring pin 210 is beveled to engage notches 212 in the periphery of the member 170 for the purpose of yieldingly positioning the several gauge pins in alignment with said abutments 182 and 184. Preferably the shoulder 211 of this pin is arranged to seat before the end of said pin 210 contacts with the member 170, permitting a slight play of the latter, so that the gauges carried thereby will not be struck always in the same spots.

Any appropriate means may be provided for operating the slide 156 at the proper times in the operation of the machine, and herein for this purpose I provide a cylindrical cam 214, shown in dotted lines in Fig. 1 and in full lines in Fig. 14, which is engaged by a roller 216 secured to the under side of said slide. The cam 214 is arranged to be operated from the power shaft of the machine through intermeshing spur gears 218 and 219 and bevel gear 220 secured to shaft 222 which shaft carries the gear 218. The bevel gear 220 is driven by a pinion 224 secured to a shaft 226 mounted in suitable bearings 228 in the frame 2 of the machine. The shaft 226 receives its motion through a train of gears 230 and 231 from a main driving shaft 232, which receives its motion from any suitable source, herein through a pulley 234. Operatively connected with the gear 230 is a driving clutch member 236 having teeth 238 arranged to be engaged by teeth 240 of a slidable clutch member 242, said clutch member 242 being desirably splined to the shaft 226 to which also is secured the pinion 224.

The sliding clutch member 242 is controlled by a rocker lever 244 pivoted at 246 to a portion of the frame 2. One arm of said lever 244 cooperates with an annular groove 248 in said sliding clutch member. The other arm is connected by a link 250 with an arm 252 secured to one end of a rocker shaft 254 arranged to rock in a suitable bearing 256 on the main frame. Attached to the opposite end of the shaft 254 is an operating lever 258 by the rocking of which the driven clutch member 242 will be thrown into engagement with the driving clutch member 236 setting the gears 224 and 220, shaft 222 and all mechanism operated therefrom in motion.

Rotating near the lever 258 is a cam member 260 having a beveled surface 262 adapted to engage a pin 264 on said lever 258 and rock said lever about the axis of the shaft 254 after the cam disk 260 has made one complete rotation, which is sufficient to complete one full cycle of the machine, whereupon said clutch member 242 will be thrown out of engagement with the clutch member 236 and the various slides of the machine will then come to a stop. The disk 260 is secured to a shaft 266 which herein carries the cylindrical cam 214 and the gear 219.

Also secured to the shaft 254 is a lever 268 which extends upwardly into engagement with a link 270 which in turn is pivoted to the rear end of an operating lever 272 pivoted at 273 to the frame 2, the forward end 274 whereof is arranged in convenient relation to the position of the operator of the machine.

By reason of the arrangement of the levers just described the machine may be started and stopped from the rear of the machine or from the front thereof according to where the operator happens to be.

Obviously with a machine of the planetary type where the grinder is inserted in a hole and the work ground by revolving said grinder about an axis that is eccentric to its own axis and in rotating the same about its own axis, it is expedient that means be provided to prevent operation of the various slides hereinbefore described for positioning the work when said work member is in one of the holes, otherwise the mandrel 3 would be broken off. To this end a safety device is provided preferably consisting of a guard plate 276 secured to the slide 82 and of sufficient length to extend over the operative end 274 of the lever 272, except when said slide is in its grinder member retracted position, as shown in Fig. 1, at which time said lever 274 will lie in the relation to said guard member 276 shown in Fig. 12. Should said guard member be directly over the member 274 the latter cannot be raised by the operator and consequently the grinder member cannot be inserted or moved against the work.

It is desirable to maintain a substantially constant supply of cooling liquid against the work during the grinding operations, and for this purpose I provide a pump 278 operated from the shaft 226 and connected by a pipe 280 with a nozzle 282 slidably extending into a recess at the back of the work *w* (see Figs. 9 and 10). The nozzle 282 is desirably stationary and provided with a single orifice 284 which automatically aligns at the proper times upon the movement of the work carrier with delivery orifices 286, 288, 290 and 292 at the back of the work to eject said cooling liquid into direct engagement with the grinder member 1 (see particularly Fig. 10).

The general operation of the machine hereinbefore described is as follows:

Assuming that the grinder member 1 is retracted as shown in Fig. 1 and the proper sized grinding tool is attached to the mandrel 3, the work is placed between the clamping jaws 128 and said jaws are then closed upon the work by turning the handle 146 in the proper direction. The operator then raises the end 274 of the lever 272 which, through its connected mechanism, shifts the clutch member 248 into engagement with the driving clutch member 236. This starts rotation of the cylindrical cam 214 and causes the transversely moving slide 156 to move in the direction of the arrow C from its initial position of rest, which is shown at the right in Fig. 1. As soon as the cam 154 engages the cam roll 158, the slide 116 is moved back against the pull of the weight 186 moving in the direction of the arrow f (Fig. 4), the carrier 170 at the same time moving back slightly under the action of the spring 173 as the pressure of the abutment 184 against the stop pin is relieved, thereby clearing the opposite or forward end of the stop pin from the fixed abutment 182 preparatory to the shifting of the pin supporting carrier which is to follow.

As the slide 156 approaches the end of its inward movement in the direction of the arrow C (Fig. 1), the pawl 194 carried by the slide engages with one of the projecting pins 192 lying within its path, freeing the carrier from the spring-pressed positioning pin 210 and rotating it through one step, thereby bringing into line with the abutments 182 and 184 the proper spacing or gauging pin which will align the first hole of the series of holes a, b, c and d with the grinder member 1, the carrier 170 being there held by the positioning pin 210 which slips in the next notch 212. On the continuing rotation of the cam 214, the movement of the slide 156 is reversed and the pawl 194 slips yieldingly past the projecting pin 192, which movement of the carrier has interposed within its path, the slide 116 and work carrier being drawn back by the weight 186 in the direction opposite to that of the arrow f as the cam roll 158 follows up the receding walls of the cam 154 until the slide 116 is brought to rest in its definitely gauged position by the stop pin last brought into the path of the abutment 184, in which position it is maintained during the subsequent grinding operation. Upon the completion of a single rotation of the shaft 266 carrying the cylindrical cam 214 which operates the slide 156, the latter is returned to its initial position of rest, as shown at the right in Fig. 1, and the clutch is thereupon automatically thrown out by the mechanism heretofore described, completing the cycle of operation of the power driven positioning mechanism and bringing it to rest. The operator then grasps the operating wheel 84 and moves the grinder member into the hole aligning therewith, and while the work remains stationary in this position said operator continues the grinding operation by gradually turning the barrel 74 to the degree of eccentricity desired until said hole is ground to the required diameter which he may determine by the readings upon said drum or by a gauge which he inserts in said hole after retracting the grinder member therefrom. Upon the completion of this hole and of the complete withdrawal of the grinder therefrom the operating lever 274 is again raised and the machine parts go through their various movements to bring the next hole in the series into alignment with the work, after which said operations are repeated until the entire series of holes in the work has been ground to the dimensions required.

By providing means including the adjusting drum 74 which is normally stationary with regard to the grinder member, the orbit about which said grinder member travels may be increased or diminished in diameter, without necessitating the stopping or slowing down of the grinder member and thereby increasing the speed of the machine and rendering the grinding extremely accurate.

It will also be apparent that by reason of the arrangement of the twin motors 94 and 96 upon opposite sides of the mandrel 3 and connected by adjustable rod 114, said mandrel may be operated at a very high rate of speed without causing uneven wear upon the shaft bearings and travel of the grinder member about its varying orbit will in no wise vary the tension of the belts 100 or cause undue vibration in the machine.

This invention is not limited to the particular embodiment shown.

We claim:

1. In combination, a grinding tool, means to move said tool in a planetary path relatively to the work, and means automatically to effect alignment of the axis of said grinding tool with a plurality of selected points in the work while said grinding tool is rotating.

2. In combination, a grinder, a planetary grinding member, a work holder, and means automatically to position the work in a plurality of positions relatively to the axis of said grinder while said grinder is rotating at high speed.

3. A grinding machine comprising in combination an abrasive grinder, means to rotate said grinder about its own axis, means to revolve said grinder about an axis eccentric to its own axis, a work holder, and means including rigid abutments automatically to move said work successively to align a plurality of points in said work with said eccentric axis while said abrasive grinder is rotating at high speed.

4. In combination, a grinder, a work holder, means to rotate said grinder, and means automatically to move one past the other in a succession of predetermined steps to align the grinder with given points on the work including cooperating spaced abutments and stop members of predetermined lengths arranged to be successively interposed between said abutments.

5. In combination, a grinder, means to rotate said grinder about its axis, means to revolve said grinder about an axis eccentric to its axis, and means including rigid abutments automatically to effect successive alignment of said eccentric axis with a plurality of points on the work.

6. In combination, a grinder, a work holder, means to rotate said grinder about its axis, means to revolve said grinder about an axis eccentric to its own axis, and means including unyielding abutments automatically to move said work holder transversely of said eccentric axis successively to align said eccentric axis with a plurality of points on the work.

7. In combination, a grinder, a work holder, means to rotate said grinder about its axis, means to revolve said grinder about an axis eccentric to its own axis at a high rate of speed, means automatically to position a series of holes in the work successively in alignment with the axis of said grinder including cooperating abutments and stops of predetermined lengths arranged to be inserted successively between said abutments, and means to vary the eccentricity of said grinder with respect to the axis about which it revolves while said grinder is rotating at said high rate of speed.

8. In combination, a grinder, a work holder, means to rotate said grinder about its axis, means to revolve said grinder about an axis eccentric to its own axis, means including cooperating abutments and stops of predetermined lengths automatically to position a series of holes in the work successively in alignment with the axis of said grinder, means to effect engagement between said grinder and work, and relatively stationary non-rotatable radially adjustable means in constant operative engagement with said grinder to vary the eccentricity of said grinder with respect to the axis about which it revolves during the operations thereof.

9. In combination, a grinder, a work holder, means to rotate said grinder about its axis, means to revolve said grinder about an axis eccentric to its own axis, means automatically to move the work successively into a plurality of predetermined positions relatively to said grinder, self-acting means to position said grinder in grinding relation with selected points on said work, said positioning means including cooperating spaced abutments and a plurality of stops of varying lengths arranged for successive interposition between said abutments, and means to vary the eccentricity of said grinder with respect to the axis about which said grinder revolves.

10. In a machine of the character described, a grinder, means to rotate said grinder, a work carrier, means to move said carrier transversely of the axis of said grinder, a fixed abutment upon the machine and a series of stops of varying lengths for limiting the movements of said work carried in one direction and adapted to be successively interposed between said carrier and said abutment for the purpose of automatically effecting alignment of said grinder with selected points on the work.

11. In a machine of the character described, a grinder, means to rotate said grinder, a work carrier, power means to move said carrier to a fixed limit in one direction, and self-acting means to reverse the movement of said carrier from said fixed limit and a plurality of stops of varying lengths adapted successively to positively align said grinder with selected points on the work.

12. In a machine of the character described, a grinder, means to rotate said grinder, a work carrier, power means to move said carried to a fixed limit in one direction, a plurality of stops of predetermined varying lengths, and self-acting means to reverse the movement of said carrier from said fixed limit and adapted during said reverse movement to move said work carrier at uniform speed successively into engagement with said stops.

13. In a machine of the character described, a tool, means to rotate said tool, a work cardier, power means to reciprocate said work carrier transversely of the axis of said tool, a series of stops of varying lengths successively operable to limit the movement of said work carrier in one direction, and means automatically to move said stops into operative positions.

14. In a grinding machine, a rotatable grinder, a work carrier, means to move said grinder axially into engagement with the work, power means to move the work transversely of the axis of said grinder, manually operable means to set said power means into operation, and safety bar pivotally connected with said manually operable means, a slide, a guard member carried by said slide and arranged to prevent pivotal movement of said bar when said guard is in a predetermined position.

15. In combination, a tool, a work carrier, positioning means to provide successive positions of adjustment for said carrier with relation to said tool, power means for readjusting said positioning means and for moving said carrier relatively to the tool into successive positions provided by said positioning means, means for actuating said power means, and safety means to prevent movement of said power actuating means when the tool is in operative engagement with the work.

16. In combination, a tool, means to revolve said tool in a circular orbit, and means to rotate said tool about its own axis during said revolutions, including a pair of balanced motors arranged upon opposite sides of the axis of said tool to swing laterally of said axis and automatically to compensate for eccentric movements of said tool about its orbit.

17. In a machine of the character described, a tool, a work carrier, power means to move said carrier in one direction, self-acting means to move said carrier in a reverse direction, and a fixed abutment, and a series of gauges of different lengths arranged to be moved successively in front of said abutment to stop said work carrier at different predetermined distances relatively to said tool.

18. In a machine of the character described, a work carrier, power means to move said carrier in one direction, cam means to permit movement of said carrier in a reverse direction, a series of gauges of different predetermined lengths, means successively to move said gauges into the path of said work carrier to stop the movement thereof at predetermined positions, and means for cushioning the impacts of said carrier.

19. In a machine of the character described, a grinder, a work carrier, means to move said work carrier to feed the work to said grinder, a series of abutments successively to stop said work carrier at selected positions relatively to said grinder, and cushioning means for softening the impact of said work carrier against said abutments.

20. In a machine of the character described, a work carrier, a fixed abutment, a series of gauges of different lengths, means to reciprocate said work carrier, means successively to interpose said gauges between said fixed abutment to vary the stopping points of said work carrier, and cushioning means to soften the impact between said gauges and contacting parts.

21. In a machine of the character described, a work carrier, a fixed abutment, a series of gauges, means automatically to interpose said gauges between said work carrier and said fixed abutment, and means to prevent said gauges from contacting with said abutment while being interposed between said work carrier and said abutment.

22. In a machine of the class described, a grinder, means to operate the grinder, a movable work carrier adapted to be brought into successive positions of alignment with relation to said grinder, means to position the carrier at differently gauged positions on the machine with relation to the grinder, power actuated mechanism for automatically readjusting the positioning means and moving the carrier into its new position of alignment, and means to apply power to said mechanism.

23. In a machine of the class described, a grinder, means to operate the grinder, a movable work carrier adapted to be brought into successive positions of alignment with relation to said grinder, means to position the carrier at differently gauged positions on the machine with relation to the grinder, power actuated mechanism for automatically readjusting the positioning means and moving the carrier into its new position of alignment, means to apply power to said mechanism, and means automatically to stop said mechanism on the completion of its cycle of operation.

24. In a machine of the class described, a grinder, means to operate the grinder, a movable work carrier adapted to be brought into successive positions of alignment with relation to said grinder, means to position the carrier at differently gauged positions on the machine with relation to the grinder, said means comprising an abutment on the carrier and a fixed abutment on the machine with a series of stop pins adapted to be interposed in succession between said abutments, power actuated mechanism for moving said carrier away from said stop pins and returning the carrier thereagainst after automatically readjusting the position of the pins, and means to apply power to said mechanism.

In testimony whereof, we have signed our names to this specification.

ARTHUR ANGUS NICHOLS.
WILLIAM HART NICHOLS.

CERTIFICATE OF CORRECTION.

Patent No. 1,872,041. August 16, 1932.

ARTHUR ANGUS NICHOLS ET AL.

It is hereby certified that error appears in the printed specification of the above numbered patent requiring correction as follows: Page 7, line 27, claim 7, before "means" insert the words relatively non-rotatable radially adjustable; page 8, line 9, claim 17, strike out the word "and" first occurrence; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.